US008949345B2

(12) United States Patent
Ferrara et al.

(10) Patent No.: US 8,949,345 B2
(45) Date of Patent: Feb. 3, 2015

(54) METHOD, SYSTEM AND COMPUTER PROGRAM FOR MANAGING COLLABORATIVE WORKING SESSIONS

(75) Inventors: Filomena Ferrara, Rome (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 12/369,677

(22) Filed: Feb. 11, 2009

(65) Prior Publication Data
US 2009/0204714 A1    Aug. 13, 2009

(30) Foreign Application Priority Data

Feb. 13, 2008    (EP) ..................................... 08101572

(51) Int. Cl.
*G06F 15/16* (2006.01)
*G06Q 10/10* (2012.01)

(52) U.S. Cl.
CPC ....................................... *G06Q 10/10* (2013.01)
USPC ............................. 709/206; 709/228; 709/207

(58) Field of Classification Search
USPC ......................................................... 709/206
See application file for complete search history.

(56) References Cited

U.S. PATENT DOCUMENTS

2003/0204474 A1*  10/2003  Capek et al. .................... 705/64
2005/0038690 A1*  2/2005   Hayes-Roth ..................... 705/9
2008/0167937 A1*  7/2008   Coughlin et al. ................. 705/9

FOREIGN PATENT DOCUMENTS

| JP | 9091354 A    | 4/1997  |
| JP | 2001331607 A | 11/2001 |
| JP | 2002123588 A | 4/2002  |
| JP | 2004318668 A | 11/2004 |
| JP | 2005190063 A | 7/2005  |
| JP | 2005316820 A | 11/2005 |

\* cited by examiner

*Primary Examiner* — Noel Beharry
(74) *Attorney, Agent, or Firm* — Kali Law Group, P.C.

(57) ABSTRACT

A solution is proposed for managing collaborative working sessions (for example, meetings). A corresponding method (600) includes the following steps under the control of a data processing system (420). At first, a set of working sessions is scheduled (606-612); each working session is to be attended by a plurality of participants; moreover, the working sessions require a set of common resources (for example, a meeting room). A communication address or more (for example, a mobile telephone number) is associated (615) with each participant. The method continues by signaling (618-630) an availability of the resources (for example, by dialing a service number and entering an identifier of a current meeting that is starting or an identifier of a preceding meeting that has just ended). In response thereto, the communication address associated with each participant to a current working session (being the first scheduled one still to be held) is retrieved (633). It is then possible to send (636) a message (indicative of a holding of the current working session) to the communication address associated with each participant to the current working session.

19 Claims, 8 Drawing Sheets

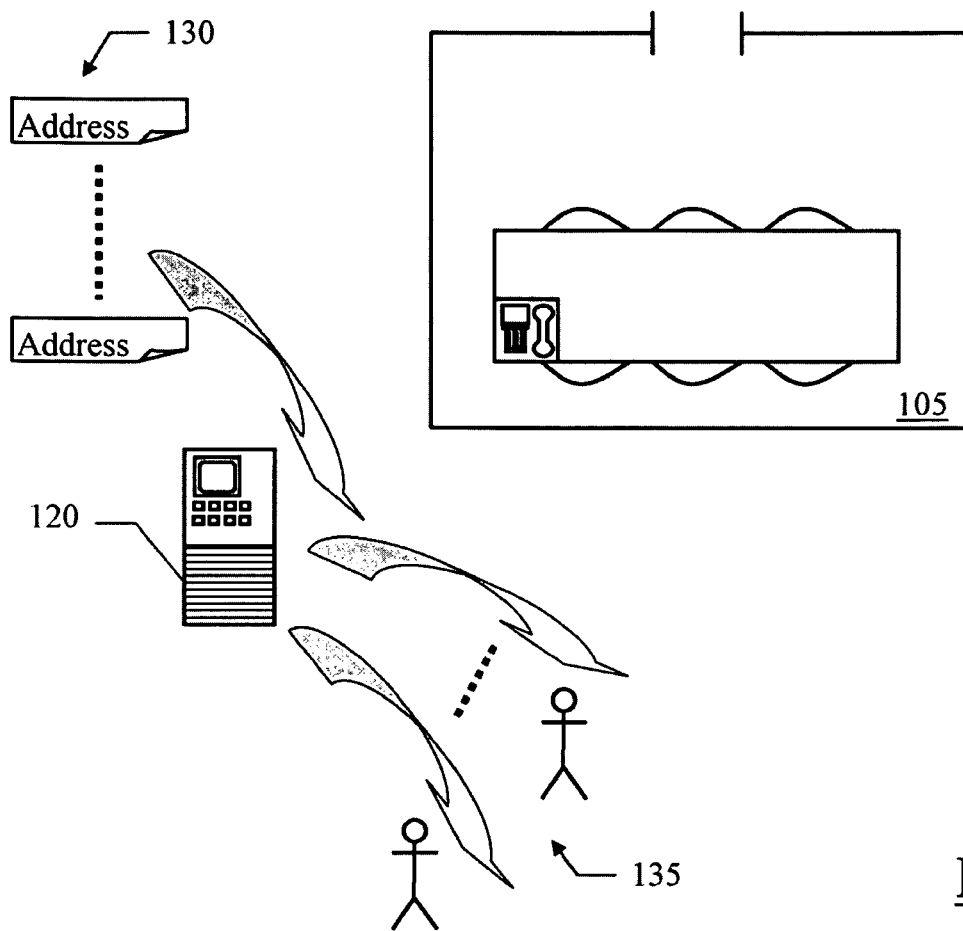
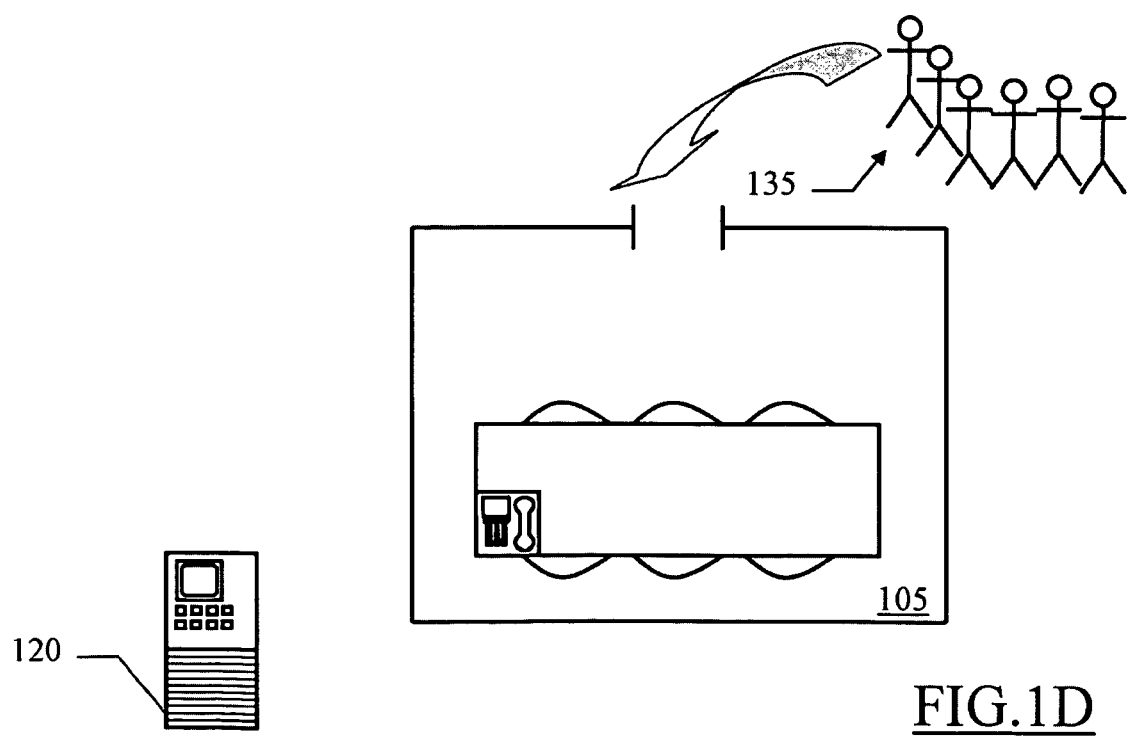
FIG.1C
FIG.1D

METHOD, SYSTEM AND COMPUTER PROGRAM FOR MANAGING COLLABORATIVE WORKING SESSIONS

PRIORITY CLAIM TO FOREIGN APPLICATION

A claim for priority is hereby made under the provisions of 35 U.S.C. §119 for the present application based upon European Patent Application No. 08101572.9 filed on Feb. 13, 2008, which is incorporated herein by reference.

TECHNICAL FIELD

The present invention relates to the information technology field. Particularly, the present invention relates to the managing of collaborative working sessions.

BACKGROUND

Working in team is a key factor in modern organizations. For this purpose, several possibilities are available to implement collaborative working sessions among multiple participants. A typical example is a meeting, wherein the participants meet in a meeting room to discuss a topic of common interest. More sophisticated solutions also allow obtaining the same result without having the participants to meet physically (thereby cutting travel costs). For example, this is possible with a conference call, wherein each participant can speak over the telephone so as to be heard by all the other participants; for this purpose, the participants dial a special service number (of a service provider that implements the conference call by linking the different telephone lines of the participants). Moreover, the dramatic development of modern telecommunication networks also makes it possible to share multimedia contents remotely among the participants. For example, in a teleconference the participants (in addition to speak over the telephone) can exchange images and videos to support the discussion. The teleconference may also be implemented entirely over the Internet (being referred to as web-conference in this case).

A problem of all the working sessions is their organization. Indeed, for this purpose a coordinator of a new working session at first has to verify the availability of the participants (or at least the ones whose attendance to the working session is mandatory). Afterwards, it is necessary to book the resources that are required to hold the working session (i.e., the meeting room or the service provider). Some tools are available to facilitate the task of the coordinator; for example, these tools allow verifying an agenda of the participants (indicating their engagements already taken), to send them invitations for the working session, to verify a calendar of the required resources (indicating their bookings), and so on.

However, when the working session is actually held, it is very difficult to meet its start and/or its end as originally scheduled.

Indeed, very often the working session ends late (for example, because the working session started after and/or it lasted more than it was scheduled). In this case, the participants to a following working session (requiring the same resources) experience a corresponding waiting time. Indeed, the participants to this working session are expected to arrive at the meeting room or to call the service number at the scheduled start of the meeting; therefore, they have to wait outside the meeting room or to continue dialing the service number, respectively. Moreover, this may cause awkward situations when the working session still in progress is interrupted by a participant to the following working session (who enters the meeting room or dials the service number).

Vice-versa, the working session may also end in advance (for example, because the working session lasted less than it was scheduled). In this case, the corresponding resources remain unused until the following working session is held (at its scheduled start).

Similar problems are experienced when any other unpredictable event affects the working sessions that are to be held (for example, because preceding working sessions are canceled).

BRIEF SUMMARY

In its general terms, the present proposal is based on the idea of notifying the participants to the working sessions of their holding.

More specifically, an aspect of the invention proposes a method for managing collaborative working sessions (for example, meetings). The method includes the following steps under the control of a data processing system. At first, a set of working sessions is scheduled; each working session is to be attended by a plurality of participants; moreover, the working sessions require a set of common resources (for example, a meeting room). A communication address or more (for example, a mobile telephone number) is associated with each participant. The method continues by signaling an availability of the resources (for example, by dialing a service number and entering an identifier of a current meeting that is starting or an identifier of a preceding meeting that has just ended). In response thereto, the communication address associated with each participant to a current working session (being the first scheduled one still to be held) is retrieved. It is then possible to send a message (indicative of a holding of the current working session) to the communication address associated with each participant to the current working session.

In an embodiment of the invention, a start of the current working session is signaled.

In another embodiment of the invention, there is instead signaled an end of a preceding working session.

In both cases, this result may be achieved by entering an identifier that is associated with the relevant working session.

As a further improvement, it is possible to determine a delay of the current working session, and then reschedule a set of following working sessions accordingly.

In this case, a message indicative of the rescheduling may be sent to the communication address associated with each participant to the following working sessions that are rescheduled.

In a proposed implementation, the delay is calculated according to a time elapsed from the scheduled start and/or the scheduled end of the current working session without its actual start and/or end.

For example, the rescheduling may be achieved by postponing and/or shortening the following working sessions.

Another aspect of the invention proposes a computer program for performing the above-described method.

A different aspect of the invention proposes a corresponding system.

BRIEF DESCRIPTION OF THE SEVERAL VIEWS OF THE DRAWINGS

The invention itself, as well as further features and the advantages thereof, will be best understood with reference to the following detailed description, given purely by way of a non-restrictive indication, to be read in conjunction with the accompanying drawings, in which:

FIGS. 1A-1D provide a pictorial representation of an exemplary application of the solution according to an embodiment of the invention.

DETAILED DESCRIPTION

With reference in particular to FIGS. 1A-1D, there is provided a pictorial representation of the sequence of operations that are executed during an exemplary application of the solution according to an embodiment of the invention.

Figure 1A:
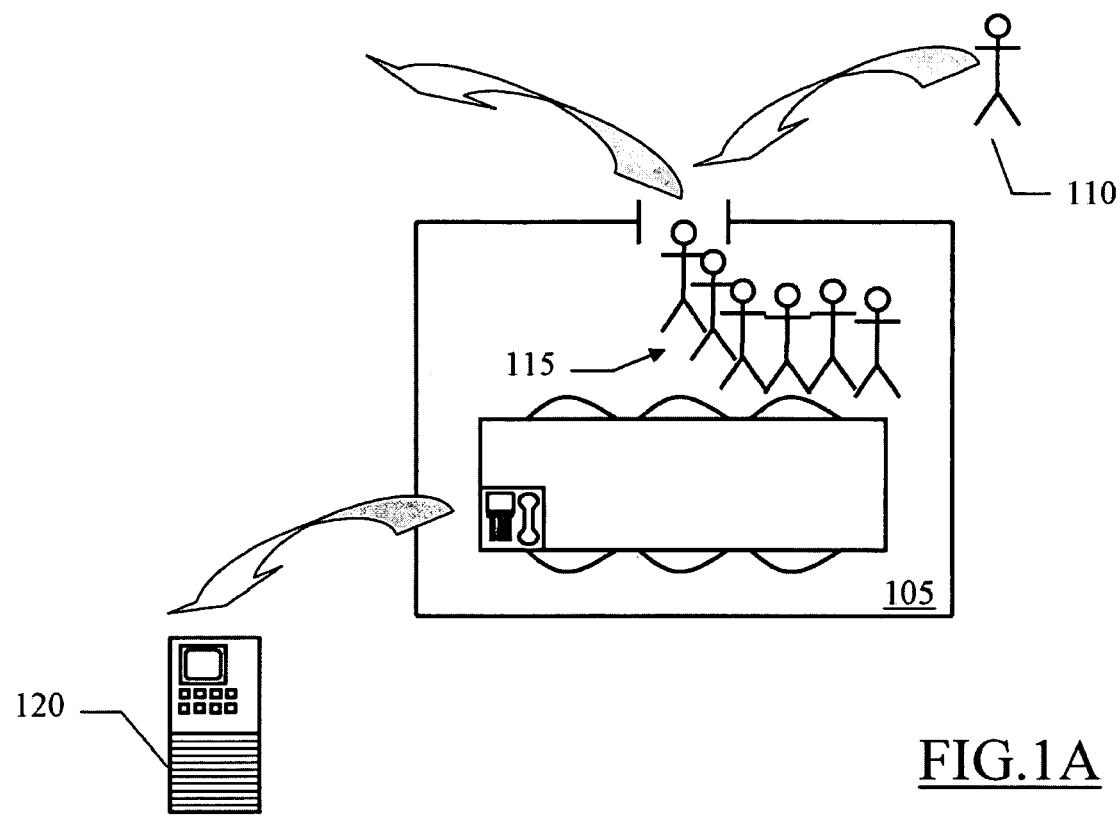

Starting from FIG. 1A, a plurality of meetings are scheduled to the held in succession in a meeting room 105 (similar considerations apply to generic working sessions requiring one or more common resources of any other type). Each (current) meeting may be held as soon as the meeting room 105 is available. This happens when a coordinator 110 of the meeting arrives at the meeting room 105 (and s/he finds it free), or when the participants 115 of a preceding meeting leave the meeting room 105. In both cases, the availability of the meeting room 105 is signaled to a service center 120—for example, by dialing a corresponding service number and entering an identifier of the meeting (to signal its start) or an identifier of the preceding meeting (to signal its end).

Figure 1B:
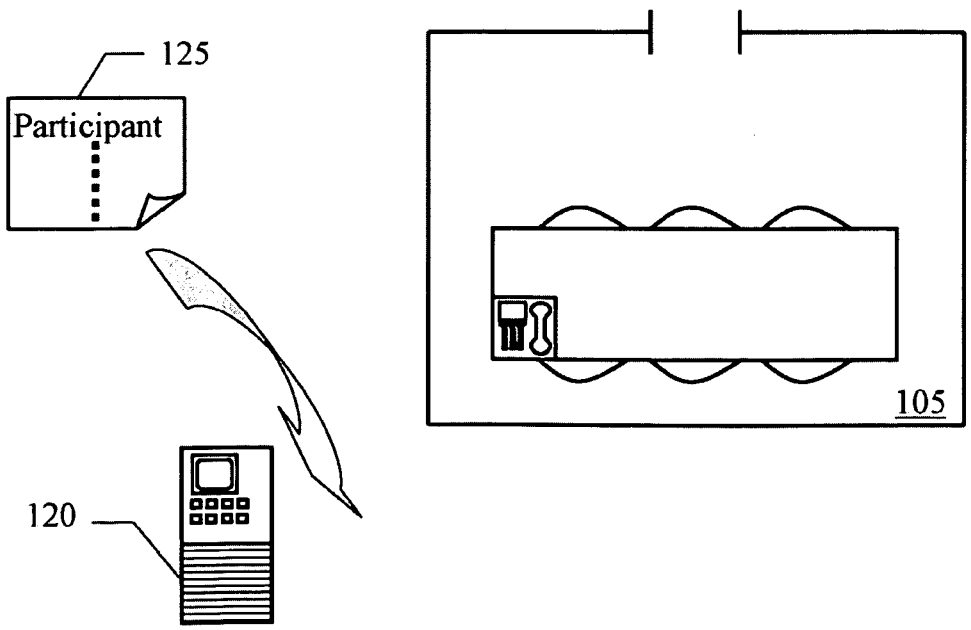

Considering now FIG. 1B, the service center 120 determines a list 125 of the participants to the meeting (for example, by accessing an object storing a definition of the meeting through its identifier).

Moving to FIG. 1C, the service center 120 retrieves a communication address 130 that is associated with each participant (for example, from a predefined table); the communication addresses (for corresponding communication channels) may be mobile telephone numbers, instant messaging addresses, e-mail addresses, and the like. The service center 120 then sends a message to each participant (denoted with 135) at its communication address; the message (such as an SMS, an instant message, or an e-mail) indicates that the meeting is going to be held.

In response thereto, as shown in FIG. 1D, all the participants 135 move to the meeting room 105, so as to arrive there just in time for the meeting to be held.

The proposed solution eliminates (or at least reduces) any waiting time for the participants, even when the preceding meeting ends late (since the participants arrive at the meeting room only when it is already available). Moreover, this prevents every participant to interrupt the preceding meeting (still in progress) by entering the meeting room by mistake.

Vice-versa, when the preceding meeting ends in advance the meeting room may even be used immediately, so as to optimize its exploitation.

With reference now to FIGS. 2a-2B and FIGS. 3A-3B, the service center may also use the same information (about the start or the end of each meeting) to reschedule the following meetings to be held afterwards in the same meeting room. In this way, the availability of the meeting room is managed in a completely dynamic way.

Figure 2A:
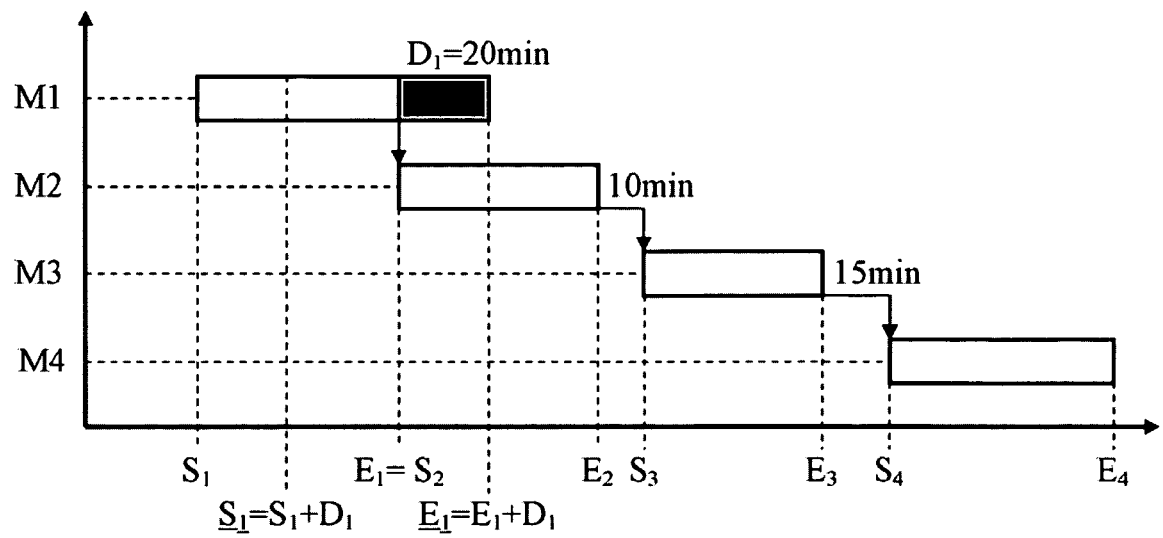
FIGS. 2A-2B show an example of application of the solution according to a further embodiment of the invention.

For example, as shown in FIG. 2A, let us assume that four meetings $M_1$, $M_2$, $M_3$ and $M_4$ are scheduled in succession during the day; the scheduling of each meeting $M_i$ (with i=1-4) is specified by its scheduled start $S_i$ and its scheduled end $E_i$ (with $S_{i+1}>=E_i$, since each meeting $M_{i+1}$ cannot start before the preceding meeting $M_i$ has ended), which values define a scheduled duration $E_i-S_i$. In the specific situation at issue, the meeting $M_2$ is scheduled immediately after the meeting $M_1$ (i.e., $S_2=E_1$), while a gap of 10 min exists between the meetings $M_3$ and $M_2$ (i.e., $S_3=E_2+10$ min) and a gap of 15 min exists between the meetings $M_4$ and $M_3$ (i.e., $S_4=E_3+15$ min). The meeting $M_1$ has a delay $D_1=20$ min; the delay $D_1$ may be determined either at an actual end $\underline{E_1}$ of the meeting $M_1$ (i.e., $D_1=\underline{E_1}-E_1$) or at an actual start $\underline{S_1}$ thereof, by assuming that an actual duration $\underline{E_1}-\underline{S_1}$ of the meeting $M_1$ is equal to its scheduled duration $E_1-S_1$ (i.e., $D_1=\underline{S_1}-S_1$).

Figure 2B:
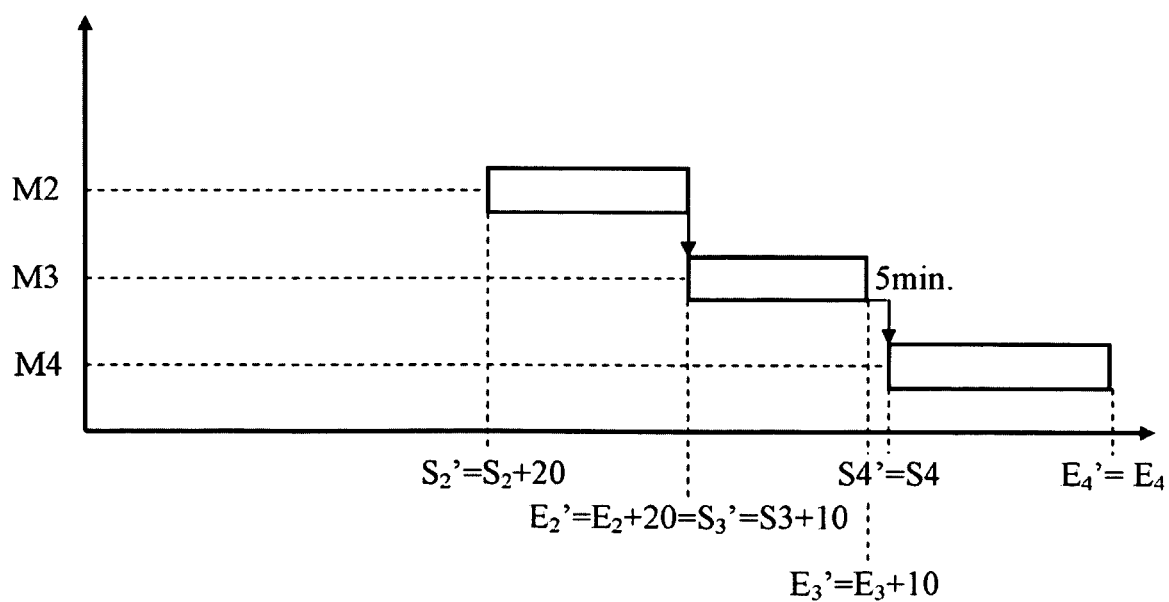

Moving to FIG. 2B, in an embodiment of the invention the following meetings $D_2-D_4$ are rescheduled by postponing them according to the delay $D_1$, so as to obtain a rescheduled start $S_j'$ and a rescheduled end $E_j'$ for each meeting $M_j$ (with j=2-4). For this purpose, the scheduled start $S_j$ and the scheduled end $E_j$ of each meeting $D_j$ are increased in succession by a residual delay resulting from the preceding meeting $M_{j-1}$ (starting from the delay $D_1$), possibly reduced by a gap $S_j-E_{j-1}$ between the meeting $M_j$ and the meeting $M_{j-1}$. The rescheduling continues until the end of the day or until the delay $D_1$ is completely absorbed by the gaps. In the example at issue, the meeting $M_2$ is postponed by the delay $D_1=20$ min (i.e., $S_2'=S_2+20$ min and $E_2'=E_2+20$ min), since the meeting $M_2$ was scheduled immediately after the meeting $M_1$. The meeting $M_3$ is instead postponed by the delay $D_2=D_1-10$ min=10 min, since a gap $S_3-E_2=10$ min existed between the meeting $M_3$ and the meeting $M_2$ (i.e., $S_3'=S_3+10$ min and $E_3'=E_3+10$ min). The meeting $M_4$ does not need to be postponed (i.e., $S_4'=S_4$ and $E_4'=E_4$), since a gap $S_4-E_3=5$ min still remains between the meeting $M_4$ and the meeting $M_3$. The proposed algorithm ensures that all the meetings maintain their scheduled duration irrespectively of any delay.

Figure 3A:
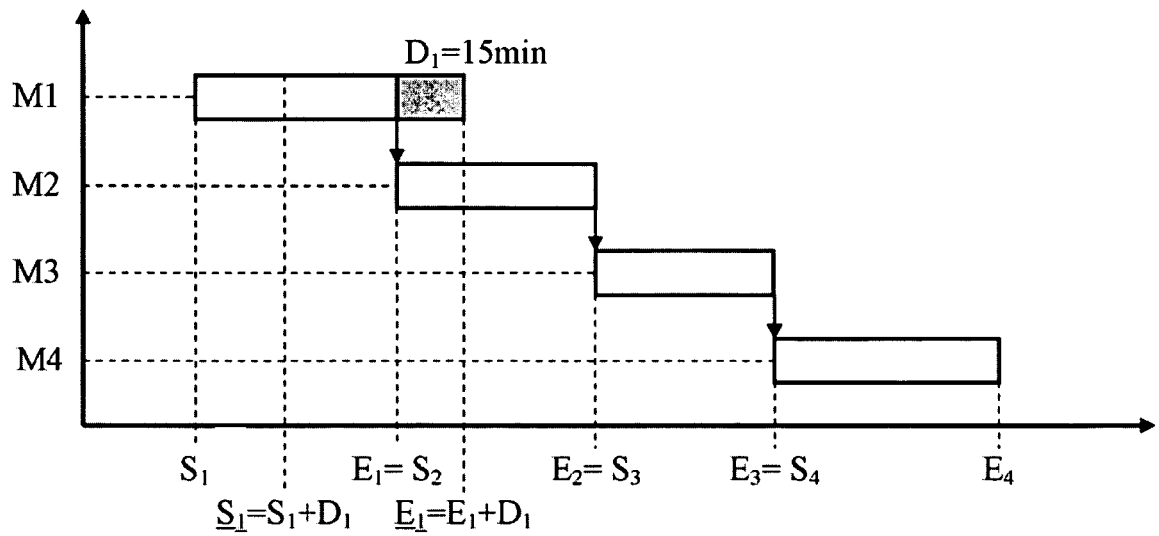
FIGS. 3A-3B show an example of application of the solution according to a still further embodiment of the invention.

With reference to FIG. 3A, let us assume now that the same four meetings $M_1$, $M_2$, $M_3$ and $M_4$ are instead all scheduled each one immediately the other without any gap between them (i.e., $S_{i+1}=E_i$). The meeting $M_1$ has a delay $D_1=15$ min (as above, determined either at an actual end $\underline{E_1}$ or at an actual start $\underline{S_1}$ of the meeting $M_1$).

Figure 3B:
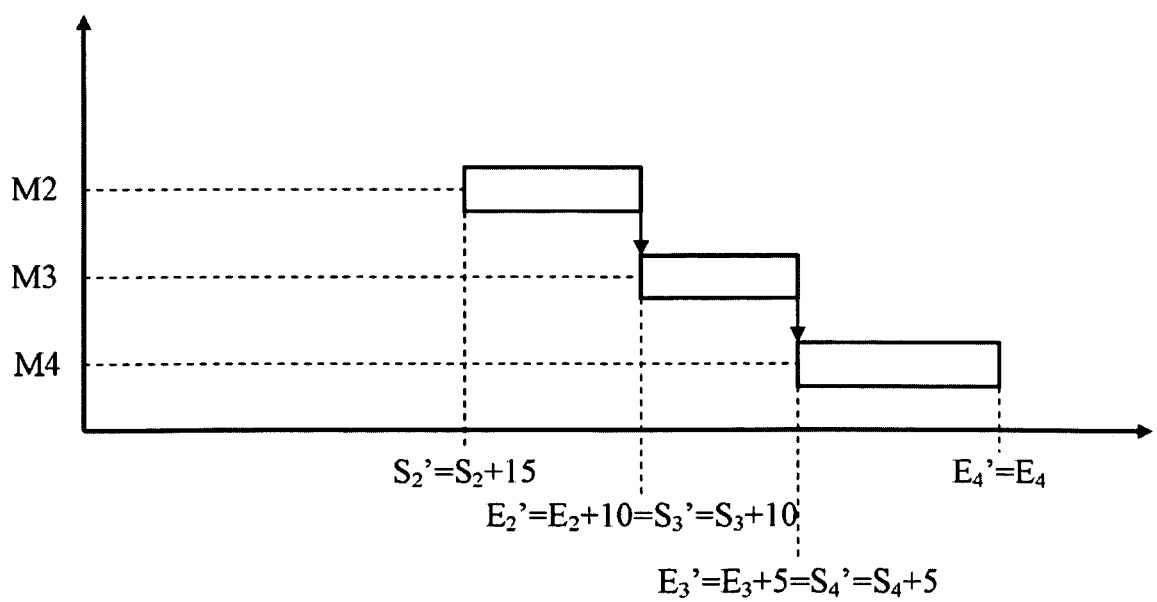

Moving to FIG. 3B, in another embodiment of the invention the following meetings $D_2-D_4$ are rescheduled by shortening them according to the delay $D_1$, again obtaining a rescheduled start $S_j'$ and a rescheduled end $E_j'$ for each meeting $M_j$ (with j=2-4). For this purpose, the scheduled start $S_j$ of each meeting $M_j$ is increased by a residual delay $D_{j-1}$ resulting from the preceding meeting $M_{j-1}$ (starting from the delay $D_1$), and its scheduled end $E_j$ is increased by the residual delay $D_{j-1}$ reduced by a predefined amount (for example, 5-15 min). The rescheduling continues until the end of the day or until the delay $D_1$ is completely absorbed by the reductions. In the example at issue (assuming a reduction of 5 min), the residual delay for the meeting $M_2$ is equal to $D_1=15$ min (i.e., $S_2'=S_2+15$ min and $E_2'=E_2+10$ min), the residual delay for the meeting $M_3$ is equal to $D_2=D_1-5$ min=10 min (i.e., $S_3'=S_3+10$ min and $E_3'=E_3+5$ min), and the residual delay for the meeting $M_4$ is equal to $D_3=D_2-5$ min=5 min (i.e., $S_4'=S_4+5$ min and $E_4'=E_4$). In this way, it is possible to minimize the rescheduling of the meetings, without a great impact on their scheduled duration.

Figure 4:
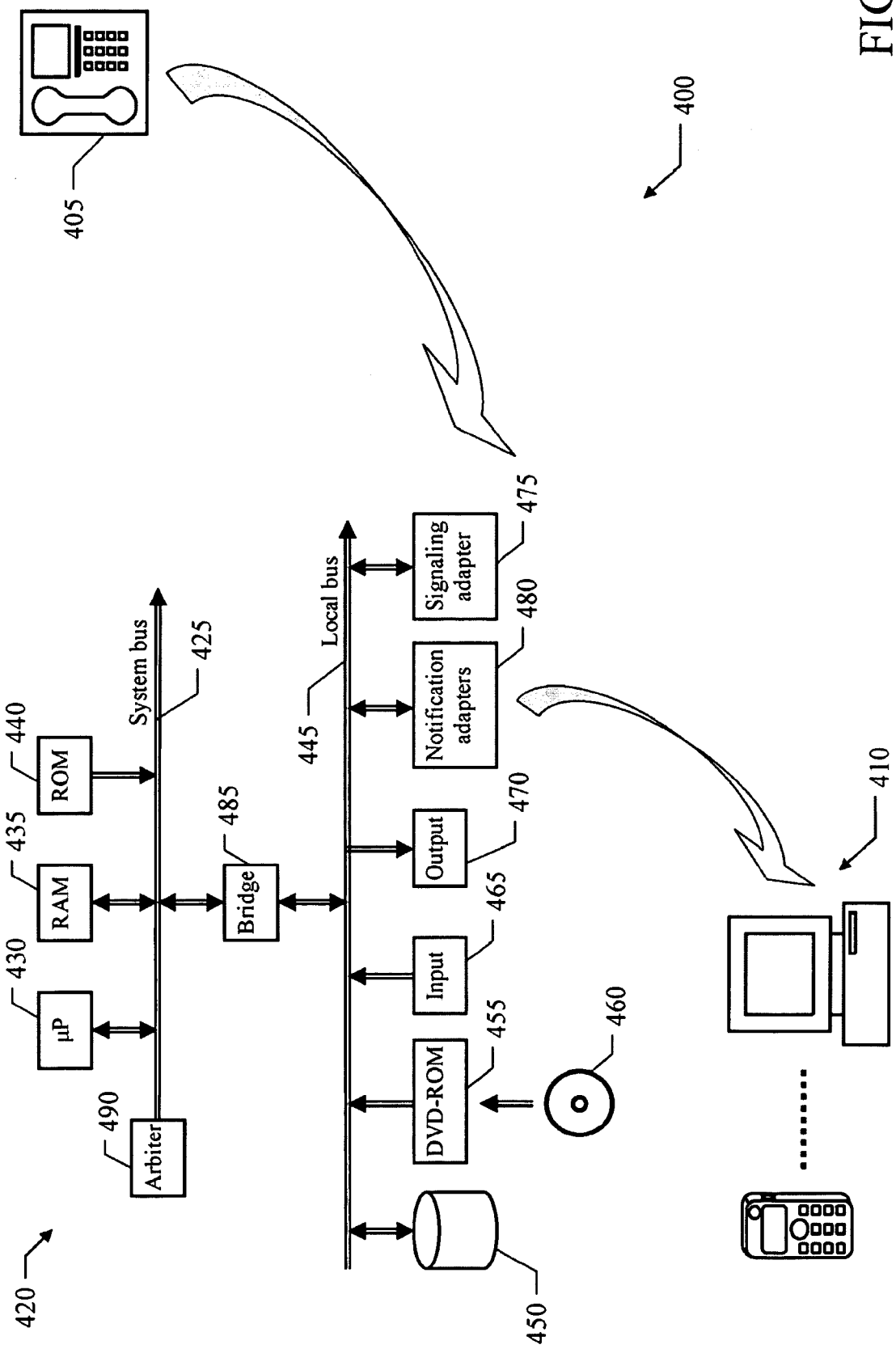
FIG. 4 is a schematic block diagram of an infrastructure that can be used to practice the solution according to an embodiment of the invention.

Considering now FIG. 4, there is illustrated a schematic block diagram of an infrastructure 400 that can be used to practice the solution according to an embodiment of the invention. The infrastructure 400 includes a telephone 405 in each meeting room (only one shown in the figure). Each person that may be invited to participate in any meeting is provided with one or more communication devices 410 (for example, a mobile telephone, a personal computer, and the like). The core of the infrastructure 400 is a server 420, which implements the above-described service center.

The server 420 is formed by several units that are connected in parallel to a system bus 425. In detail, one or more microprocessors (IP) 430 control operation of the server 420; a RAM 435 is directly used as a working memory by the microprocessors 430, and a ROM 440 stores basic code for a bootstrap of the server 420. Several peripheral units are clustered around a local bus 445 (by means of respective interfaces). Particularly, a mass memory consists of one or more hard-disks 450 and drives 455 for reading DVD- and CD-ROMs 460. Moreover, the server 420 includes input units 465 (for example, a keyboard and a mouse), and output units 470 (for example, a monitor). A signaling adapter 475 is used to access the server 420 by each telephone 405 (through a land telephone network, not shown in the figure). One or more notification adapters 480 enable the server 420 to send messages to the communication devices 410 through corresponding communication networks (not shown in the figure)—for example, a mobile telephone network, the Internet, and the like. A bridge unit 485 interfaces the system bus 425 with the local bus 445. Each microprocessor 430 and the bridge unit 485 can operate as master agents requesting an access to the system bus 425 for transmitting information. An arbiter 490 manages the granting of the access with mutual exclusion to the system bus 425.

Figure 5:
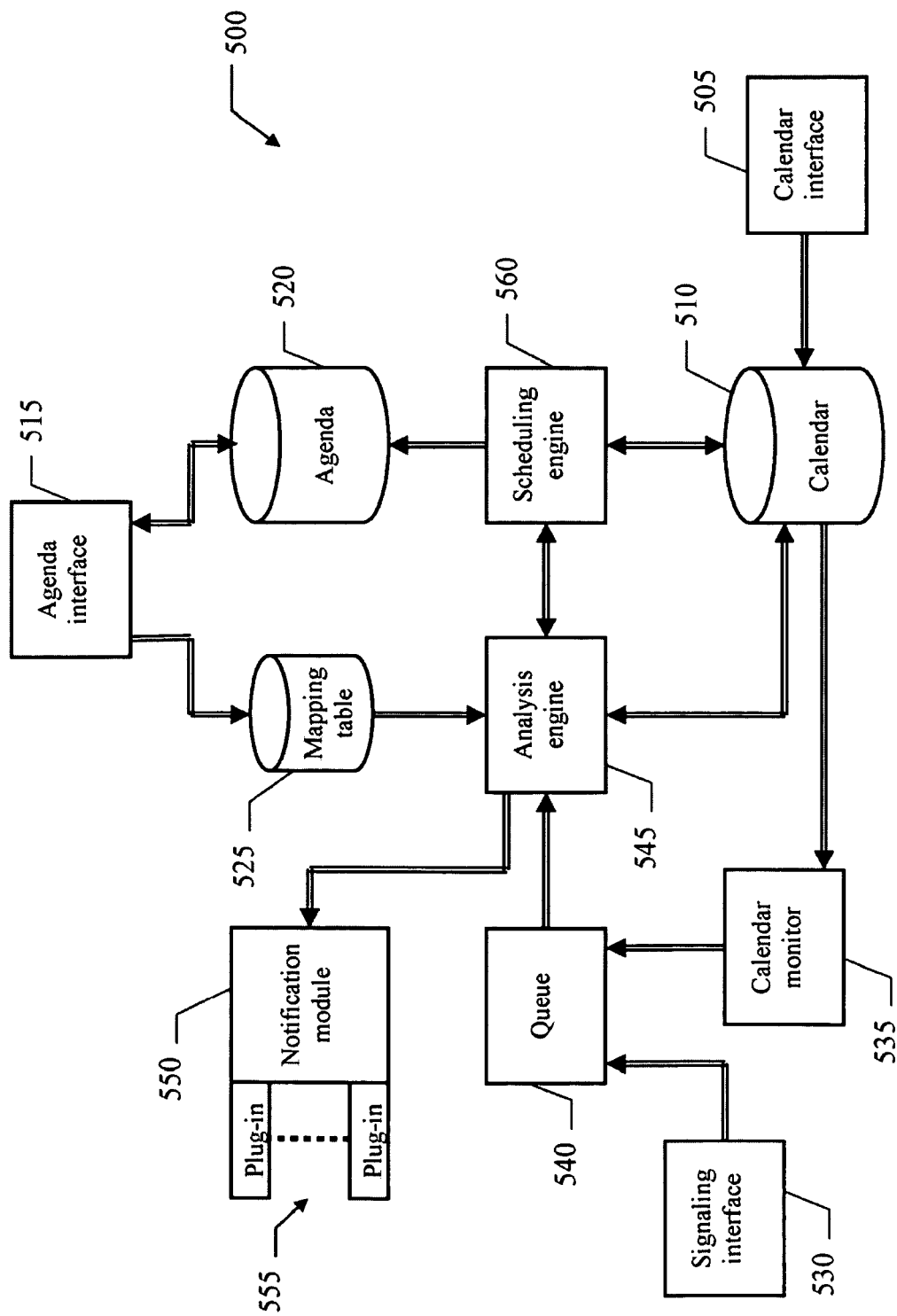
FIG. 5 shows the main software components that may be used to implement the solution according to an embodiment of the invention.

Moving to FIG. 5, there are illustrated the main software components that can be used to implement the solution according to an embodiment of the invention. The information (programs and data) is typically stored on the hard-disk and loaded (at least partially) into the working memory of the server when the programs are running. The programs are initially installed onto the hard disk, for example, from DVD-ROM.

Particularly, the server runs a collaborative tool 500. The collaborative tool 500 includes a calendar interface 505, which is used to schedule the meetings to be held in the different meeting rooms by the corresponding coordinators. For each new meeting being scheduled, the calendar interface 505 creates an object that includes a definition of the meeting (i.e., its identifier, a code of the meeting room, the scheduled start and scheduled end, and a UserId of each participant). The objects of all the meetings (still to be held) are stored in a calendar 510.

An agenda interface 515 is instead used by each (potential) participant to the meetings to organize its engagements. The engagements taken by the participant (including the meetings that s/he has accepted to attend) are stored in a personal agenda 520. The agenda interface 520 is also used by the participant to edit a corresponding entry of a mapping table 525; the mapping table 525 associates the participant (through his/her UserId) with the corresponding communication address, or more (which may also consist of the same UserId).

A signaling interface 530 receives the calls from the telephones in the different meeting rooms; the signaling interface 530 collects the information entered through the telephones (i.e., the identifiers of the meetings that are starting or that have just ended in the corresponding meeting rooms). A calendar monitor 535 periodically detects the possible meetings that are late, since they have not started yet after their scheduled start or they have not ended yet after their scheduled end; for each late meeting, the calendar monitor 535 determines the corresponding delay (according to the time elapsed from the scheduled start or the scheduled end). The signaling interface 530 and the calendar monitor 535 generates an event record whenever the start or the end of a meeting is signaled (by the signaling interface 530), or whenever a late meeting is detected (by the calendar monitor 535). These event records are pushed in succession into a queue 540.

The event records in the queue 540 are consumed by an analysis engine 545. When a (current) event record is indicative of the availability of a meeting room, the analysis engine 545 retrieves (from the calendar 510) the list of the participants to a first meeting that is scheduled to be held in it. For each participant to this meeting, the analysis engine 545 then retrieves the corresponding communication address from the mapping table 525. The analysis engine 545 now drives a notification module 550 to send a message (indicating that the meeting is going to be held) to the communication address of each participant. For this purpose, the notification module 550 interfaces with different plug-in modules 555, each one for a corresponding communication channel (for example, to send SMSs, instant messages, e-mails, and the like).

Conversely, when the event record is indicative of a late meeting the analysis engine 545 invokes a scheduling engine 560. The scheduling engine 560 reschedules the following meetings in the calendar 510 (if it is necessary) by postponing or shortening them. The scheduling engine 560 retrieves the list of the participants to each meeting that has been rescheduled from the calendar 510. The agenda 520 of each participant to these meetings is then updated accordingly; preferably, any delay in the meetings still to be attended is highlighted with a different color (such as red) in a graphical representation of the agenda (for example, in a Gantt chart). In addition or in alternative, the scheduling engine 560 asks the analysis engine 545 to send a message indicative of the rescheduling to each participant (as above, by retrieving the corresponding communication address from the mapping table 525 and then driving the notification module 550 accordingly).

Figure 6A:
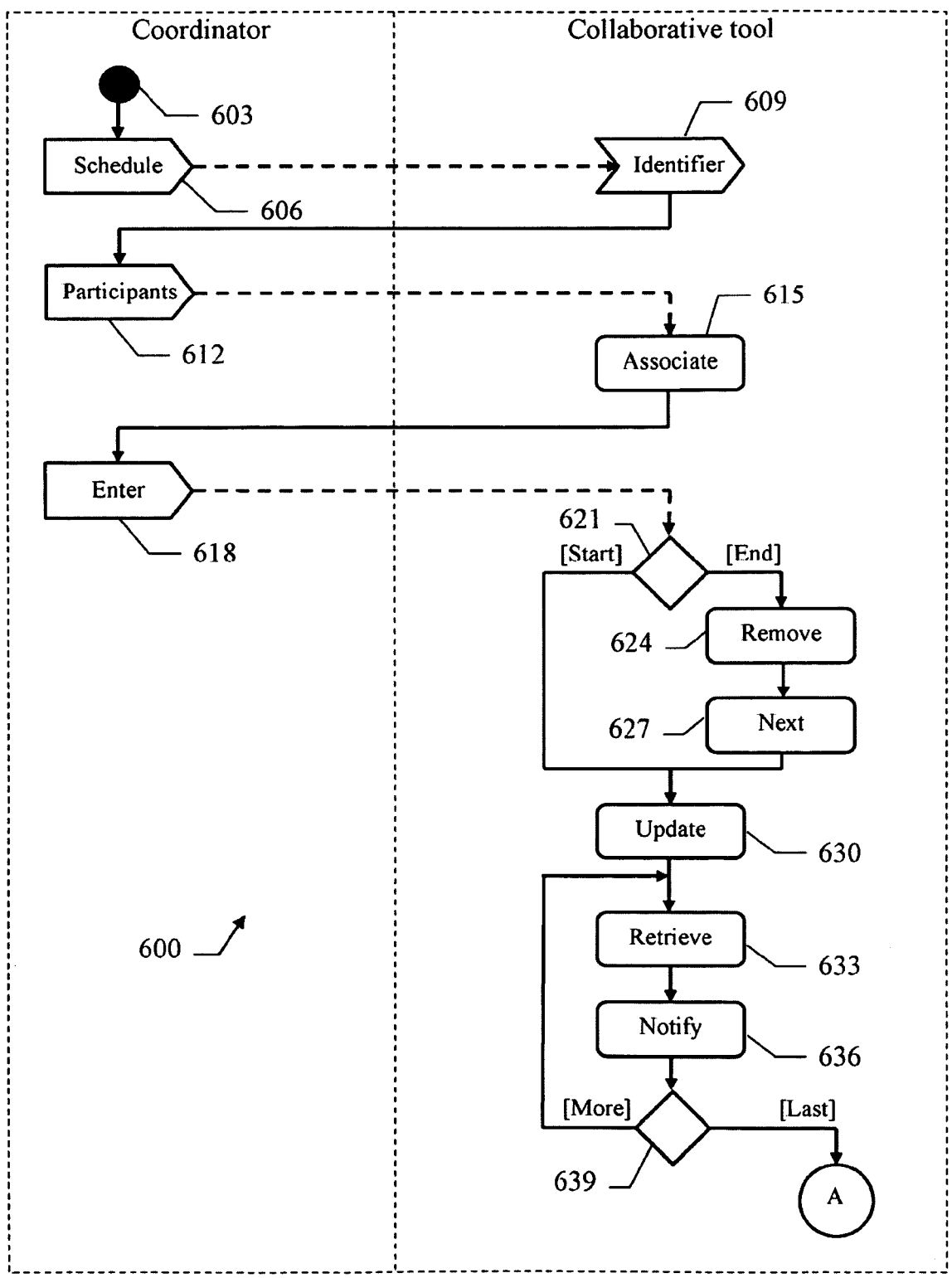
FIGS. 6A-6B illustrate a diagram describing the flow of activities relating to an implementation of the solution according to an embodiment of the invention.
Figure 6B:
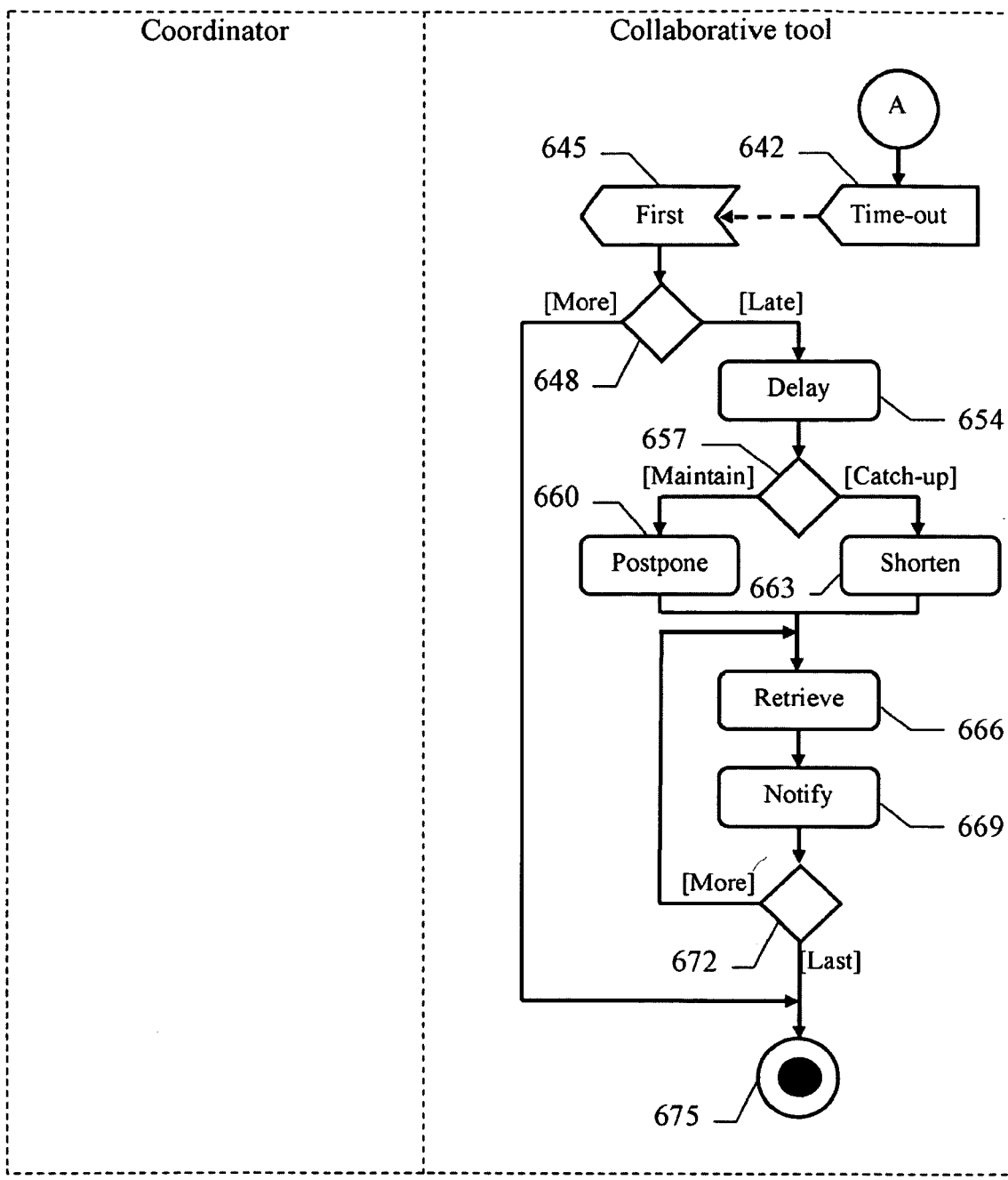

As shown in FIGS. 6A-6B, the logic flow of an exemplary process that can be implemented in the above-described system (to manage the meetings) is represented with a method 600.

The method begins at the start block 603, and then passes to block 606 as soon as a generic coordinator decides to schedule a new meeting. For this purpose, the coordinator accesses the calendar interface of the collaborative tool; the coordinator then selects a desired scheduled start and scheduled end for an available meeting room (being not taken yet for the corresponding scheduled period, as indicated in the calendar). In response thereto, the collaborative tool at block 609 generates a unique identifier for this meeting. This feature is already supported by some collaborative tools known in the art; however, in this case the identifier of the meeting is externalized and returned to the coordinator. Preferably, the identifier consists of a short numeric code (for example, of 4 digits), so as to facilitate its use by the coordinator; its should be noted that the relatively few numbers of combinations that are available for the identifier are not a problem, since the different identifiers have to be maintained only until the corresponding meetings end (and they can be reused afterwards). Returning to the swim-lane of the coordinator at block 612, the participants to the meeting are selected. In response thereto, the collaborative tool at block 615 creates a new object for the meeting with its definition (i.e., the identifier, the code of the meeting room, the scheduled start and scheduled end, and the UserId of each participant); in this way, the UserId of each participant allows associating him/her with the corresponding communication address (indicated in the mapping table).

With reference now to block 618, when a generic meeting is starting or it has just ended, the corresponding coordinator dials the service number of the collaborative tool; a synthesized voice prompts the coordinator to enter a command code including the identifier of this meeting; preferably, the command code includes an additional digit, which is used to specify the type of event (such as the start or the end of the meeting).

The flow of activity then branches at block 621 in the swim-lane of the collaborative tool according to the type of event that has been signaled. Particularly, if the command code indicates that the meeting has ended, the corresponding object is removed from the calendar at block 624 (so as to make its identifier available for new meetings to be scheduled). The identifier of the first meeting that is scheduled to be held in the same meeting room directly after the meeting that has just ended is retrieved at block 627 from the calendar. The method then descends into block 630; the same point is also reached from block 621 directly when the command code indicates that the meeting is starting. In both cases, the object of the meeting to be held in the (available) meeting room is updated to indicate its start.

A loop is then performed to notify each participant to this meeting that it is going to be held (possibly excluding the coordinator when s/he has signaled its starting to the collaborative tool). The loop begins at block 633, wherein the UserId of a current participant starting from the first one (as indicated in the object of the meeting) is used to retrieve the corresponding communication address. Passing to block 636, a message indicating that the meeting is going to be held is transmitted to this communication address. An exit condition for the loop is verified at block 639. If further participants remain to be notified, the method returns to block 633 to repeat the same operations for a next participant. Conversely, the process descends into block 642.

In a completely independent way, the meetings still to be held are monitored to determine when they are late. For this purpose, as soon as a predefined time-out expires (for example, every 5-10 min), the method passes from block 642 to block 645; in this phase, the collaborative tool retrieves the scheduled start of the first meeting that is scheduled to be held and/or the scheduled end of the meeting that is in progress in each meeting room. The proposed value of the time-out is a good compromise between the opposed requirements of increasing the accuracy in the determination of the delay (low time-out) and of limiting the rescheduling of the following meetings (high time-out).

A test is then performed at block 648 to verify whether the scheduled start and/or the scheduled end of this meeting have already elapsed. If so, the meeting is late, and its delay is determined at block 654. Particularly, when the meeting has been identified as late because it has not started yet after its scheduled start, the delay is set to the difference between a current time and the scheduled start; on the other hand, when the meeting has been identified as late because it has not ended yet after its scheduled end, the delay is set to the difference between the current time and the scheduled end.

It should be noted that when the meeting is identified as late because it has not started yet after its scheduled start, it is possible to reschedule the following meetings in advance (at least by the scheduled duration of the late meeting); in this way, the participants to the meetings that are rescheduled have enough time to organize accordingly. However, the delay is merely an estimate of its actual value, since it is not possible to know a prior when the meeting will actually end; therefore, the meetings may be rescheduled in excess or even uselessly (when the meeting deemed to be late instead lasts for a time shorter than its scheduled duration, and then ends with a lower delay or even on time). Conversely, when the meeting is identified as late because it has not ended yet after its scheduled end, it is possible to measure its delay exactly. However, the following meetings can now be rescheduled only at the last moment; particularly, the time available for the meeting that is scheduled to be held directly after the late meeting is at most equal to the gap between them (if any).

The flow of activity then branches at block 657 according to the configuration of the collaborative tool. If the collaborative tool is set to reschedule the following meetings (which are scheduled to be held after the late meeting in the same meeting room) by maintaining their scheduled duration, the process continues to block 660; in this case, the following meetings are postponed according to the delay (until the end of the day or until the delay is completely absorbed by the possible gaps). Conversely, if the collaborative tool is set to reschedule the following meetings by minimizing the impact on them, the process continues to block 663; in this case, the following meetings are shortened according to the delay (until the end of the day or until the delay is completely absorbed by the reductions of the scheduled duration of the following meetings).

A further loop as above is then performed to notify each participant to the meetings that have been rescheduled. The loop begins at block 666, wherein the UserId of a current participant (starting from the first one) is used to retrieve the corresponding communication address. Passing to block 669, a message indicating that the meeting has been rescheduled is transmitted to this communication address. An exit condition for the loop is verified at block 672. If further participants remain to be notified, the method returns to block 666 to repeat the same operations for a next participant. Conversely, the process ends at the concentric white/block stop circles 675. The same point is reached directly from block 648 when no meeting is late.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

For example, the proposed solution lends itself to be implemented with an equivalent method (by using similar steps, removing some steps being non-essential, or adding further optional steps); moreover, the steps may be performed in a different order, concurrently or in an interleaved way (at least in part).

Similar considerations apply to the managing of whatever collaborative working sessions (such as seminars, courses, conference calls, teleconferences, web-conferences, and so on); likewise, the working sessions may require any other number and/or type of common resources (such as critical participants, presenters, projectors, demo PCs, white-boards, and so on). The above-described communication channels (to be used to notify the participants) are merely illustrative; for examples, other possible communicating channels are based on voice messages or special ring tones over the telephone, pagers, and so on. Moreover, the availability of the required resources may be signaled (to the collaborative tool) in a number of different ways (such as via a web browser, a client program, an SMS, a hand-held device, and the like). Nothing prevents associating two or more communication addresses with each participant; the different communication addresses may be used alternatively (for example, for different periods of the day) and/or in combination.

The above-described procedures for signaling the availability of the meting room (or any equivalent resources) are merely illustrative. For example, it is possible to signal only the start of the meetings, only the end of the meetings, or both of them. Moreover, the signaling of the end of the meetings may also be used to represent their cancellation. Alternatively, a process may be implemented to verify the availability of each meting room periodically. More generally, it is possible to signal any other event that makes the meeting room available (for example, the moving of the preceding meeting to another meeting room). In a more sophisticated implementation—wherein each working session may require multiple resources—it is possible to signal each event that releases one or more resources (such as the end of the meeting that held them); the collaborative tool tracks the status of each resource, and determines that each meeting can be held as soon as all the required resources become available.

The identifier of the meeting may have any other format (for example, shorter or longer); moreover, it is also possible to a use mnemonic code (such as the UserId of its coordinator or a fantasy name that is entered by him/her). Any other command code (including the identifier of the meeting) may be transmitted to the collaborative tool; moreover, when the collaborative tool supports the signaling of a single event (i.e., the start or the end of the meetings), it is possible to use the identifier of the meeting only (without any additional digit). In any case, in a very simplified implementation of the invention, the availability of the meeting room may be signaled with a simple command that does not include any information about the meeting (for example, by pressing a button in the meeting room to signal the start and/or the end of every meeting being held in it).

The feature of rescheduling the meetings following a late meeting is not strictly necessary, and it may be omitted in a specific embodiment of the invention; in this case, the decision about any possible rescheduling of the following meetings may be left to the coordinator of the late meeting.

Similar considerations as above apply to the notification of the rescheduling of the meetings to their participants. However, nothing prevents using different communication channels for the notifications of the meetings that are going to be held and of the meetings that are rescheduled; in any case, it is also possible simply to modify the agenda of the participants to the meetings that are rescheduled without sending any distinct notification.

The above-described algorithms for determining the delay of each meeting are merely illustrative. For example, it is possible to estimate the delay only when the meeting has not started yet after its scheduled start, to measure it only when the meeting has not ended yet after its scheduled end, or both of them. Moreover, the delay may also be calculated when the meeting actual starts and/or ends (with respect to the scheduled start and/or the scheduled end, respectively) without any monitoring.

In any case, the meetings may be rescheduled according to any other policy. For example, it is possible only to postpone them, only to shorten them, or to combine the two actions (i.e., compacting the meetings by removing any gaps and thus shortening them if it is necessary). Moreover, more sophisticated policies may be based on some priority scheme (so as to minimize the impact of the rescheduling on the most important meetings).

The proposed solution may be implemented directly in the collaborative tool (as indicated above), as a plug-in for a preexisting collaborative tool, or even as a stand-alone module. It would be readily apparent that it is also possible to deploy the same solution as a service that is accessed through a network (such as in the Internet).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by any data processing system or in connection therewith (for example, within a virtual machine); particularly, the program may be in the form of external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware.

The proposed method may also be carried out on a system having a different architecture or including equivalent units (for example, based on a local network). Moreover, the server may have another structure or may include similar elements (such as cache memories temporarily storing the programs or parts thereof); in any case, it is possible to replace the server with one or more data processing entities, or with a combination thereof (such as a multi-tier architecture, a grid computing infrastructure, and the like).

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for managing a plurality of collaborative working sessions using an electronic computing device comprising:
   scheduling the plurality of collaborative working sessions in succession, wherein each of the plurality of collaborative working session is associated with a plurality of participants, and wherein the scheduling of the plurality of collaborative working sessions depends on an availability of a plurality of common resources wherein the plurality of common resource is a resource selected from the group consisting of: a meeting room, a projector, a demo PC, and a white-board;
   causing the electronic computing device to associate at least one communication address with each of the plurality of participants;
   causing the electronic computing device to signal an immediate availability of the plurality of common resources associated with a current working session;
   causing the electronic computing device to retrieve the at least one communication address associated of each of the plurality of participants corresponding with the availability of the plurality of common resources associated with a successive working session; and
   causing the electronic computing device to send a message to indicate the immediate availability of the plurality of common resources associated with each participant, such that a wait time at the meeting room between the current working session and the successive working sessions is at least reduced.

2. The method of claim 1, wherein the signaling the availability of the resources comprises:
   signaling a start of the current working session; and
   signaling an end of a preceding working session being scheduled directly before the current working session.

3. The method of claim 2, wherein
   the scheduling the plurality of collaborative working sessions comprises:
      associating an identifier with each of the plurality of collaborative working sessions, and wherein
   the signaling the availability of the resources comprises:
      entering the identifier of the current working session to signal the start thereof,
      and entering the identifier of the preceding working session to signal the end thereof.

4. The method of claim 2, further comprising:
   determining a delay of the current working session; and
   rescheduling a plurality of following working sessions being scheduled after the current working session in accordance with the delay.

5. The method of claim 4, wherein the rescheduling the plurality of following working sessions comprises:
   retrieving the at least one communication address associated with each of the plurality of participants associated with the plurality of following working sessions; and
   sending a delay message indicative of the rescheduling of the plurality of following working sessions to the at least one communication address.

6. The method of claim 4, wherein
   the scheduling the plurality of collaborative working sessions comprises:
      specifying a scheduled start for each of the plurality of collaborative working sessions,
      specifying a scheduled end for each of the plurality of collaborative working sessions, and wherein
   the determining the delay of the current working session comprises:
      monitoring for an actual start of the current working session,
      monitoring for an actual end of the current working session,
      calculating the delay in accordance with a time elapsed from the scheduled start and a current time if the current working session is kite, and
      calculating the delay in accordance with a time elapsed from the scheduled end of the current working session and the current time if the current working session is late.

7. The method of claim 6, wherein rescheduling the plurality of following working sessions comprises postponing the plurality of following working sessions in accordance with the delay.

8. The method of claim 6, wherein rescheduling the plurality of following working sessions comprises shortening the plurality of following working sessions in accordance with the delay.

9. The method of claim 4, wherein the delay is absorbed by a gap between the plurality of collaborative working sessions scheduled in succession or by as shortening of is scheduled duration of the plurality of collaborative working sessions scheduled in succession.

10. The method of claim 1, wherein the plurality of collaborative working sessions is a session selected from the group consisting of: a seminar, a course, a conference call, a teleconference, and a web-conference.

11. The method of claim 1, wherein the at least one communication address is an address selected from the group consisting of a mobile telephone number, an instant messaging address, and an e-mail address.

12. The method of claim 1, wherein the message is a message selected from the group consisting of an SMS, an instant message, and an e-mail.

13. A computer program product for managing collaborative working sessions, the computer program comprising:
   a non-transitory computer readable medium;
   first programmatic instructions for scheduling, the plurality of collaborative working sessions in succession, wherein each of the plurality of collaborative working session is associated with a plurality of participants, and wherein the scheduling of the plurality of collaborative working sessions depends on an availability of a plurality of common resources wherein the plurality of common resource is a resource selected from the group consisting of: a meeting room, a projector, a demo PC, and a white-board;
   second programmatic instructions for associating at least one communication address with each of the plurality of participants;
   third programmatic instructions for signaling an immediate availability of the plurality of common resources associated with a current working session;
   fourth programmatic instructions for retrieving the at least one communication address associated of each of the plurality of participants corresponding with the availability of the plurality of common resources associated with a successive working session; and
   fifth programmatic instructions for sending a message to indicate the immediate availability of the plurality of common resources associated with each participant, such that a wait time at the meeting room between the current working session and the successive working sessions is at least reduced.

14. The computer program product of claim 13, wherein the third programmatic instructions for signaling the availability of the resources comprises:
   sixth programmatic instructions for signaling a start of a current working session; and
   seventh programmatic instructions for signaling an end of a preceding working session being scheduled directly before the current working session, wherein
the first programmatic instructions for scheduling the plurality of collaborative working sessions comprises:
   eighth programmatic instructions for associating an identifier with each of the plurality of collaborative working sessions, and wherein
the third programmatic instructions for signaling an availability of the plurality of common resources comprises:
   ninth programmatic instructions for entering the identifier of the orient working session to signal the start thereof, and
   tenth programmatic instructions for entering the identifier of the preceding working session to signal the end thereof.

15. The computer program product of claim 14, further comprising:
   eleventh programmatic instructions for determining a delay of the current working session; and
   twelfth programmatic instructions for rescheduling a plurality of following working sessions being scheduled after the current working session in accordance with the delay.

16. The computer program product of claim 15, wherein the delay is absorbed by a gap between the plurality of collaborative working sessions scheduled in succession or by a shortening of a scheduled duration of the plurality of collaborative working sessions scheduled in succession.

17. A system for managing a plurality of collaborative working sessions under the control of a data processing system, the system comprising:
   causing the data processing system to provide a calendar interface for scheduling the plurality of collaborative working sessions wherein each collaborative working session is attended by a plurality of participants, and wherein the scheduling of the collaborative working sessions depends on an availability of a plurality of common resources wherein the plurality of common resource is a resource selected from the group consisting of: a meeting room, a projector, a demo PC, and a white-board;
   causing the data processing system to provide an agenda interface for associating at least one communication address with each of the plurality of participants;
   a signaling interface for signaling an immediate availability of the plurality of common resources associated with a current working session;
   an analysis engine electronically coupled with the data processing system for retrieving the at least one communication address associated with each of the plurality of participants of a successive working session; and
   a notification module electronically coupled with the data processing system for sending a message indicative of a timing of the current working session to the at least one communication address associated with each of the plurality of participants of the successive working session, such that a wait time at the meeting room between the current working session and the successive working sessions is at least reduced.

18. The system of claim 17, wherein the plurality of common resources includes a meeting room and wherein signaling interface includes a telephone for dynamically verifying an availability of the meeting room immediately before a start of one of the plurality of collaborative working session, immediately after an end of one of the plurality of collaborative working sessions and during one of the plurality of collaborative working sessions.

19. A system for managing a plurality of collaborative working sessions under the control of a data processing system, the system comprising:
   means for scheduling the plurality of collaborative working sessions wherein each collaborative working session is attended by a plurality of participants, and wherein the scheduling of the collaborative working sessions depends on an availability of a plurality of common resources wherein the plurality of common resource is a resource selected from the group consisting of: of meeting room, a projector, a demo PC, and a white-board;
   means for associating at least one communication address with each of the plurality of participants;
   means for signaling an immediate availability of plurality of common resources associated with a current working session;
   means for retrieving the at least one communication address associated with each of the plurality of participants of a successive working session; and
   means for sending a message indicative of a timing of the current working session to the at least one communication address associated with each of the plurality of participants of the successive working session, such that a wait time at the meeting room between the current working session and the successive working sessions is at least reduced.

* * * * *